US007466687B2

(12) United States Patent
Basso et al.

(10) Patent No.: US 7,466,687 B2
(45) Date of Patent: Dec. 16, 2008

(54) PACKET CLASSIFICATION USING MODIFIED RANGE LABELS

(75) Inventors: Claude Basso, Raleigh, NC (US); Jean Louis Calvignac, Cary, NC (US); Gordon Taylor Davis, Chapel Hill, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 10/425,097

(22) Filed: Apr. 28, 2003

(65) Prior Publication Data

US 2004/0213275 A1    Oct. 28, 2004

(51) Int. Cl.
*H04L 12/28* (2006.01)
(52) U.S. Cl. .................. 370/351; 370/389; 370/395.54; 370/411
(58) Field of Classification Search ................. 370/351, 370/389, 395.3, 392, 230, 411
See application file for complete search history.

(56) References Cited

U.S. PATENT DOCUMENTS

| | | | |
|---|---|---|---|
| 5,265,094 A | 11/1993 | Schmickler et al. | |
| 5,414,650 A | 5/1995 | Hekhuis | |
| 5,422,881 A | 6/1995 | May et al. | |
| 5,892,924 A | 4/1999 | Lyon et al. | |
| 5,920,705 A | 7/1999 | Lyon et al. | |
| 5,951,651 A * | 9/1999 | Lakshman et al. | 709/239 |
| 5,991,300 A | 11/1999 | Tappan | |
| 5,995,971 A * | 11/1999 | Douceur et al. | 707/102 |
| 6,341,130 B1 | 1/2002 | Lakshman et al. | |
| 6,374,303 B1 | 4/2002 | Armitage et al. | |
| 6,611,875 B1 * | 8/2003 | Chopra et al. | 709/245 |

(Continued)

OTHER PUBLICATIONS

Marc Defossez, "Content Addressable Memory (CAM) in ATM Appliances", Application Note: Virtex Series and Virtex-II Series, XAOO202 (v1.2) Jan. 6, 2001, http://www.xilinx.com/legal.htm, pp. 1-12.
A.P.J. Engbersen, J. Van Lunteren, "Prefix-based Parallel Packet Classification"; RZ 3210 (#93256) Mar. 6, 2000; Computer Science/ Mathematics, 15 pages, IBM Research, Zurich Research Laboratory, 8803 Ruschlikon, Switzerland.

*Primary Examiner*—Kwang B. Yao
*Assistant Examiner*—Andrew Lai
(74) *Attorney, Agent, or Firm*—Josh G. Cockburn; Dillon & Yudell LLP

(57) ABSTRACT

A method and system for encoding a set of range labels for each parameter field in a packet classification key in such a way as to require preferably only a single entry per rule in a final processing stage of a packet classifier. Multiple rules are sorted accorded to their respective significance. A range, based on a parameter in the packet header, is previously determined. Multiple rules are evaluated according to an overlapping of rules according to different ranges. Upon a determination that two or more rules overlap, each overlapping rule is expanded into multiple unique segments that identify unique range intersections. Each cluster of overlapping ranges is then offset so that at least one bit in a range for the rule remains unchanged. The range segments are then converted from binary to Gray code, which results in the ability to determine a CAM entry to use for each range.

7 Claims, 10 Drawing Sheets

U.S. PATENT DOCUMENTS

| | | | |
|---|---|---|---|
| 6,633,563 B1 * | 10/2003 | Lin et al. | 370/389 |
| 6,691,168 B1 * | 2/2004 | Bal et al. | 709/238 |
| 6,757,779 B1 * | 6/2004 | Nataraj et al. | 711/108 |
| 6,904,053 B1 * | 6/2005 | Berman | 370/466 |
| 6,904,057 B2 * | 6/2005 | Sarkinen et al. | 370/469 |
| 2002/0009076 A1 * | 1/2002 | Engbersen et al. | 370/389 |
| 2002/0191605 A1 | 12/2002 | Lunteren et al. | |
| 2003/0152076 A1 * | 8/2003 | Lee et al. | 370/389 |

* cited by examiner

Fig. 4a — 3 Optimum Alignments for Ranges of 16 Entries

Fig. 4b — 7 Optimum Alignments for Ranges of 8 Entries

Fig. 4c — 15 Optimum Alignments for Ranges of 4 Entries

PACKET CLASSIFICATION USING MODIFIED RANGE LABELS

BACKGROUND OF THE INVENTION

1. Technical Field

The present invention relates in general to a field of networking, and, in particular, to an improved method and system for classifying data packets.

2. Description of the Related Art

Data being transferred and transmitted across a network, including a network such as the Internet, are typically transmitted in discrete units called packets. A packet is a finite amount of data that is identified by a packet header.

FIG. 1 illustrates a typical system of networks interconnected by routers. Network routers 100, 102 and 104 are gateways that connect two or more distinct computer networks 110, 112, 114, 116, and 118 for the purpose of transferring data packets from one network to another. Typically, network routers 100, 102, and 104 support Internet Protocol (IP) and/or Transmission Control Protocol/Internet Protocol (TCP/IP) network formats. Such routers are typically in compliance with the International Organization for Standardization (ISO) networking model that includes seven layers of functionality, of which the routers deal with four layers: the physical layer, the data link layer, the network layer, and the transport layer (from bottom to top). The other layers, going up the stack, are the session layer, the presentation layer, and the application layer. Each layer conceptually provides function that is used by the next higher layer. A physical layer is directed to the hardware, such as the specifics of how data is transmitted over a certain network medium. The data link layer is concerned with using the physical layer to move data from one machine to another on a single network. The network layer uses the data link layer to move data from one machine to another over different networks.

Referring to FIG. 2, data packet 200 is a basic transmission unit used by networks using the TCP/IP protocol. Information transmitted over a TCP/IP protocol network is encapsulated in a TCP/IP packet 202 before being wrapped in the appropriate link layer headers and trailers, such as media access control (MAC) header 204 and MAC trailer 206 and sent over the network.

In the Open System Interconnection (OSI) networking model, the data link layer can be split into two functions: media access control (MAC) and logical link control (LLC). MAC deals with how to get data into the correct physical form (e.g., electrical voltages) to access the physical layer. LLC handles the addressing of a data packet to get from one piece of hardware to another on the same network. The MAC and LLC layers add a MAC header 204 and a MAC trailer 206, and put the resulting frame on the physical network. (At this level, the data packet, or data gram, is referred to as a frame.) As such, the LLC is a component of the router; and responds to a request from the network layer to send a packet from the system to a remote system by establishing a path to that remote system and returning control to a network layer where a processing of the actual packet contents takes place. In packets utilizing the IP and/or TCP/IP protocol, TCP/IP packet 202 includes both the actual data 220 as well as a TCP/IP "5-tuple" 208. TCP/IP 5-tuple 208 includes IP source address 210, IP destination address 212, TCP source port 214, TCP destination port 216, and IP protocol type 218. Data 202 typically also includes a check sum 222 (for performing check sum error detection), packet length 224 (for giving the length of IP packet 202), and transport control 226 (giving the number of routers the packet has passed through on its way to its destination). It should be noted that individual fields are not illustrated in the order they appear in a packet, but are grouped for convenience of description.

Packet classification is a critical function of all routers. The results of packet classification may be used to determine which of many supported flows a packet should be associated with. This in turn, may affect certain routing decisions, quality of service, traffic shaping or limiting, or even whether or not such packets are forwarded at all. In a general case, packets may be classified using a classification key that includes an arbitrary number of fields. For example, the classification may be based on the TCP/IP 5-tuple 208 described in FIG. 2.

The determination of how a packet should be handled, including prioritization, ultimate destination in the packet, determination of what type server or router the packet should next be directed, is determined by matching a rule to selected parameters of the packet header. A rule is said to match a packet if all of the conditions specified by that rule (in terms of acceptable ranges of values) are met by the actual values in the selected parameters of the packet header. Rule conditions are typically expressed by exact match, prefix match, and range match. That is, a rule may apply to a packet header contains parameter values that fall within a portion of the corresponding parameter ranges defined by the rule. For example, a rule may be focused on the IP source address 210. One rule may route the packet to a particular network if the IP source address 210 is a single specific number, hence there being an exact match. Another rule may direct packets to a particular network if the prefix of the IP source address 210 is the same, thus a prefix match. Alternatively, a rule may direct a packet to a specific network if the IP source address 210 is between a range of numbers, such as 150 to 180, thus having a range match. Similarly, rules may have conditions that are expressed as exact match, prefix match, and/or range match for other components of an IP 5-tuple 208 or other packet header information in an IP packet 202.

Packet classification in general is a difficult problem, requiring significant amounts of storage and multiple accesses to that storage. As networks increase in speed, and the size and complexity of classification rules increase, new techniques must be developed to meet packet processing requirements.

For lower speed applications, tree structures have been applied to the patent classification problem. The number of memory accesses required to follow a chain of pointers to the desired rule grows significantly as a set of classification rules is expanded, limiting the usefulness of this approach. Content-addressable memories (CAM's) are being used for packet classification in certain applications, but they have a somewhat limited memory capacity, and are significantly more expensive than conventional random access memory. On the other hand, CAM's are capable of very high-speed operation, making them very attractive packet classification devices for higher speed routers.

Therefore, there is a need for a method and system to categorize packet header information while minimizing the amount of memory required.

SUMMARY OF THE INVENTION

The present invention is directed to a method and system for encoding a set of range labels for each parameter field in a packet classification key in such a way as to require preferably only a single entry per rule in a final processing stage of a packet classifier.

A rule, which is an instruction to a router for processing a network packet, is associated with one or more parameters in a packet header, where each parameter corresponds to a different dimension of the rule. Processing of these rules is described relative to a single dimension. Multi-dimensional rules are processed independently for each dimension to generate a collection of range numbers for each dimension.

Multiple rules are sorted in each dimension according to their respective significance. A range, based on acceptable limits for parameter values, is determined for each dimension. Isolated (not overlapping with parameter ranges of other rules) rule parameters are assigned to individual arbitrary range numbers to be associated with corresponding parameter value segments. Individual dimensions of all rules are then evaluated, identifying overlapping of rules according to different ranges.

Upon a determination that two or more rules overlap, each rule in the cluster of overlapping rules is expanded into multiple unique parameter value segments that identify unique range intersections. The unique segments are then expanded such that each rule has a number of segments that is a power of two, and rules with fewer parameter range segments have equal numbers of segments on either side of intersections with ranges of other rules consisting of a larger number of segments.

The balanced intersections between parameter ranges of two rules are referred to as folding points. Each cluster of overlapping ranges is then offset so that the largest range in a cluster is positioned in such a way that all bits making up the collection of range numbers defining that range are either fixed or "don't care" for each range number in the entire collection. This area is referred to as an optimum alignment position.

The range segment numbers are then converted from binary to Gray code, which results in the ability to determine a single ternary value corresponding to the collection of segment numbers representing each rule dimension. Ternary values are generated for each dimension of each rule to be loaded into a Ternary CAM, using one CAM entry for each rule.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

FIG. 3b depicts graphically an expansion of overlapping ranges for rules illustrated in FIG. 3a;

FIGS. 4a-c illustrate optimum range alignment options using Gray code sequences;

DETAILED DESCRIPTION OF A PREFERRED EMBODIMENT

Figure 1:
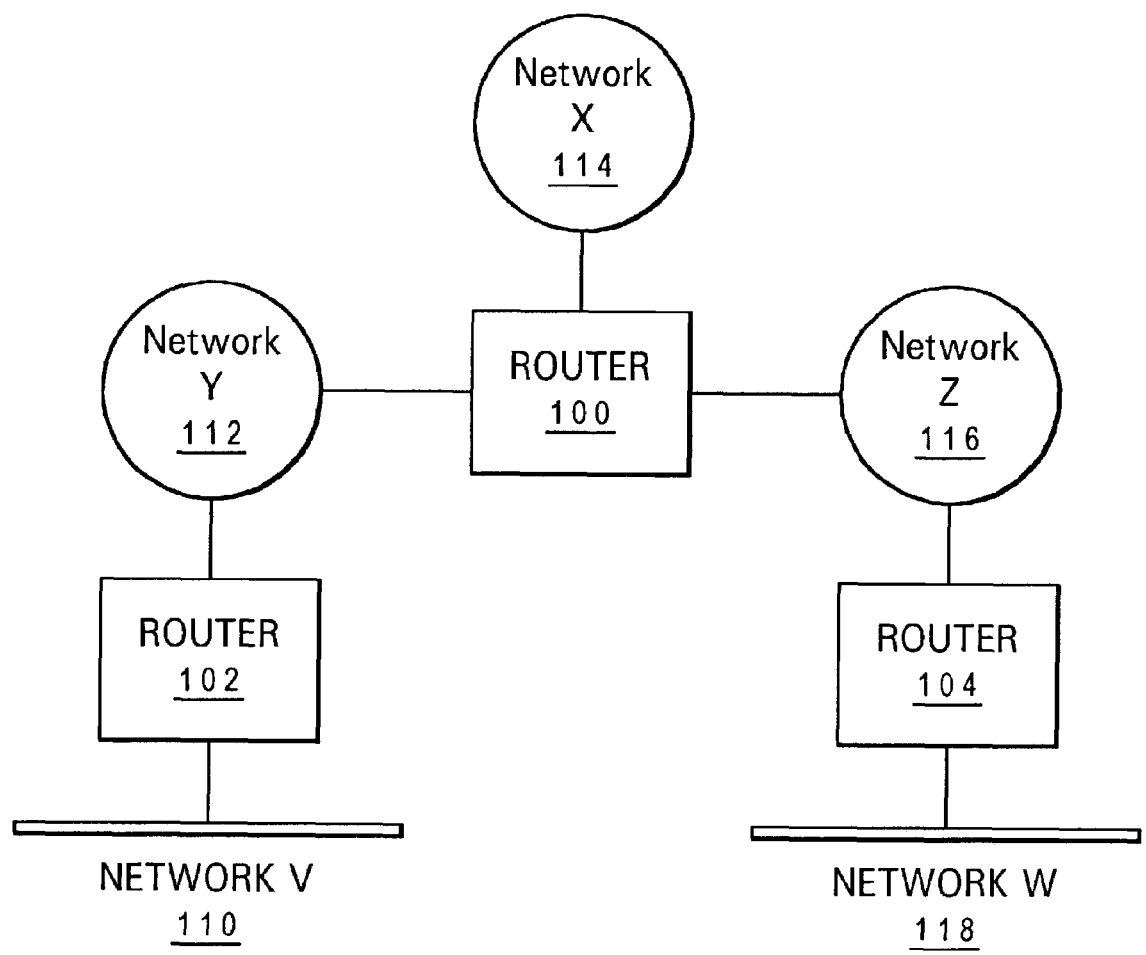
FIG. 1 depicts a block diagram of a prior art interconnection of networks using routers.
Figure 2:
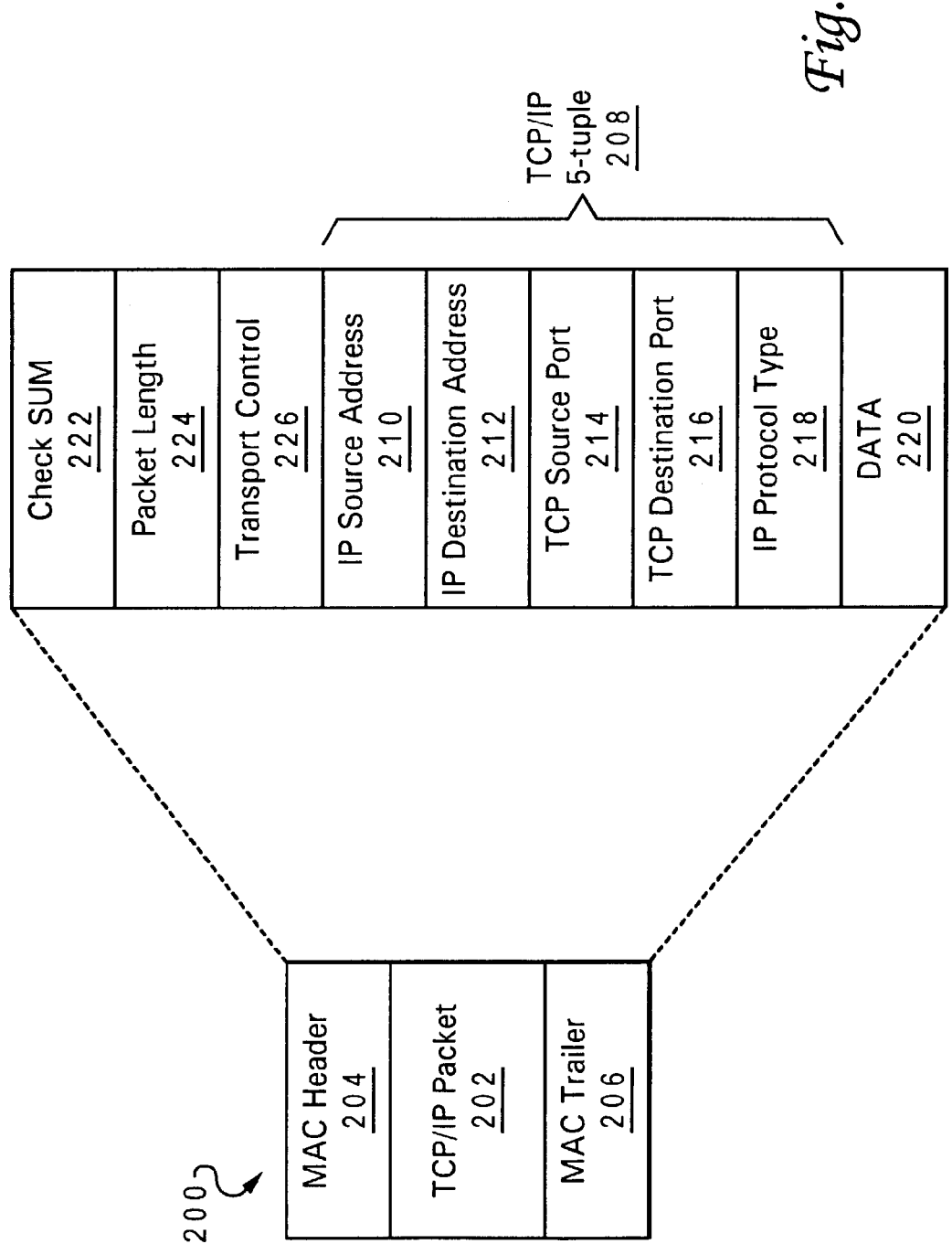
FIG. 2 illustrates a block diagram of a typical packet for data transmission consisting of various header parameters encapsulating the data.
Figure 3A:
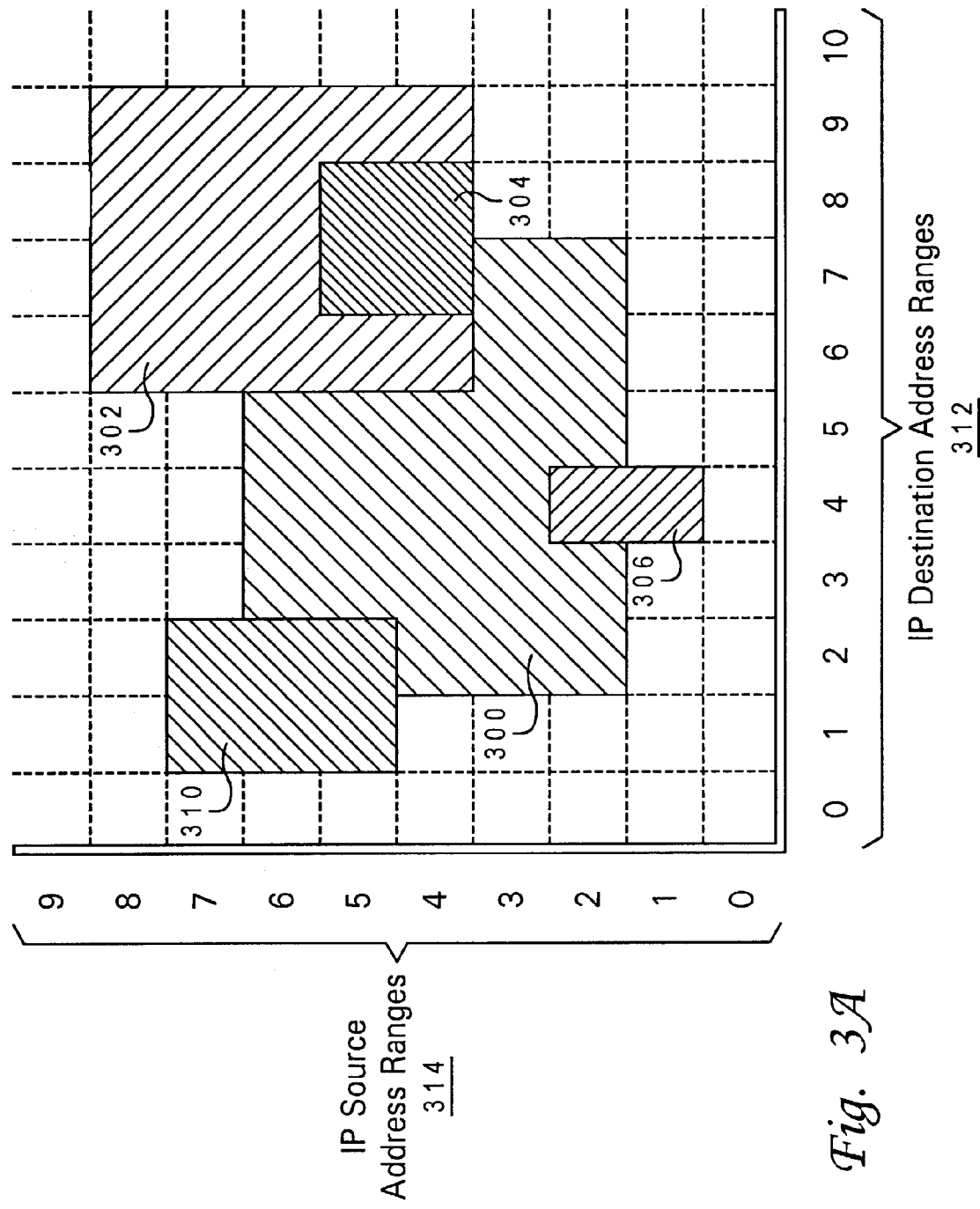
FIG. 3a illustrates graphically packet rules associated with ranges of IP source addresses and IP destination addresses.

With reference now to FIG. 3a, there is depicted a graph of rules that apply to different ranges of dimensions in a packet header. For purposes of clarity, only two dimensions (IP source address 314 and IP destination address 312) are shown. Note, however, that more than two dimensions may be evaluated for each rule. However, since each dimension is processed individually, two dimensions are adequate to visualize the process as shown in the following figures. FIG. 3-a graphically depicts five rules, 300, 302, 304, 306 and 310. A specific rule is applicable if a defined range of IP source addresses 314 and IP destination address ranges 312 are determined to encompass the specific address values from the IP header. For example, consider rule 300, 302, and 304. A range number is determined according to a dimension of the IP header, preferably in a manner shown below in FIG. 5. Each range number may correspond to a single parameter value or to a range of parameter values, depending on the definition of a specific rule. Referring again to FIG. 3a, rule 300 is applicable when the IP source address of a packet falls within one of the ranges in dimension 314 designated by range numbers 2, 3, 4, 5, or 6, and the IP destination address of that packet falls within one of the ranges in dimension 312 designated by range numbers 2, 3, 4, 5, 6 or 7. As an example of how these ranges correspond to rules, the prefix of the IP destination address range might be 0101 for range 2, 011X for range 3, 1000 for range 4, 1001 for range 5, 101X for range 6, 1100 for range 7, 1101 for range 8, and 111X for range 9, all figures being in binary notation. Each of these ranges is represented in the pre-processing CAM, requiring a single entry per range for ranges defined by prefixes, but potentially requiring multiple entries for arbitrary ranges. Priority of CAM entries may be used to reduce the number of entries required to represent some ranges if segments of those ranges can be covered by other higher priority CAM entries. Thus, rule 300 applies when the IP destination address is between "0101" and "1100". Similarly, rule 302 applies when the IP destination address is between "1010" and "1111", and rule 304 applies when the IP destination address is between "1100" and "1101". Note that rules labeled according to the simple binary numbering of range segments as illustrated in FIG. 3-A may typically require multiple entries in a final stage CAM for complete representation. For example, rule 302 would require two entries, "011X" and "100X" to represent range segments 6, 7, 8, and 9, where X denotes "don't care".

Rule 300 overlaps with rules 302, 304, 306, and 310 with regard to the IP destination address dimension 312, specifically those IP destination address ranges labeled 6 and 7 of rule 300 overlap rule 302, range labeled 7 also overlaps rule 304, range labeled 4 overlaps rule 306, and range labeled 2 overlaps rule 310. Thus, having determined that at least one rule overlaps another rule, rule 300 must be expanded into multiple unique segments that identify unique range intersections.

Figure 3B:
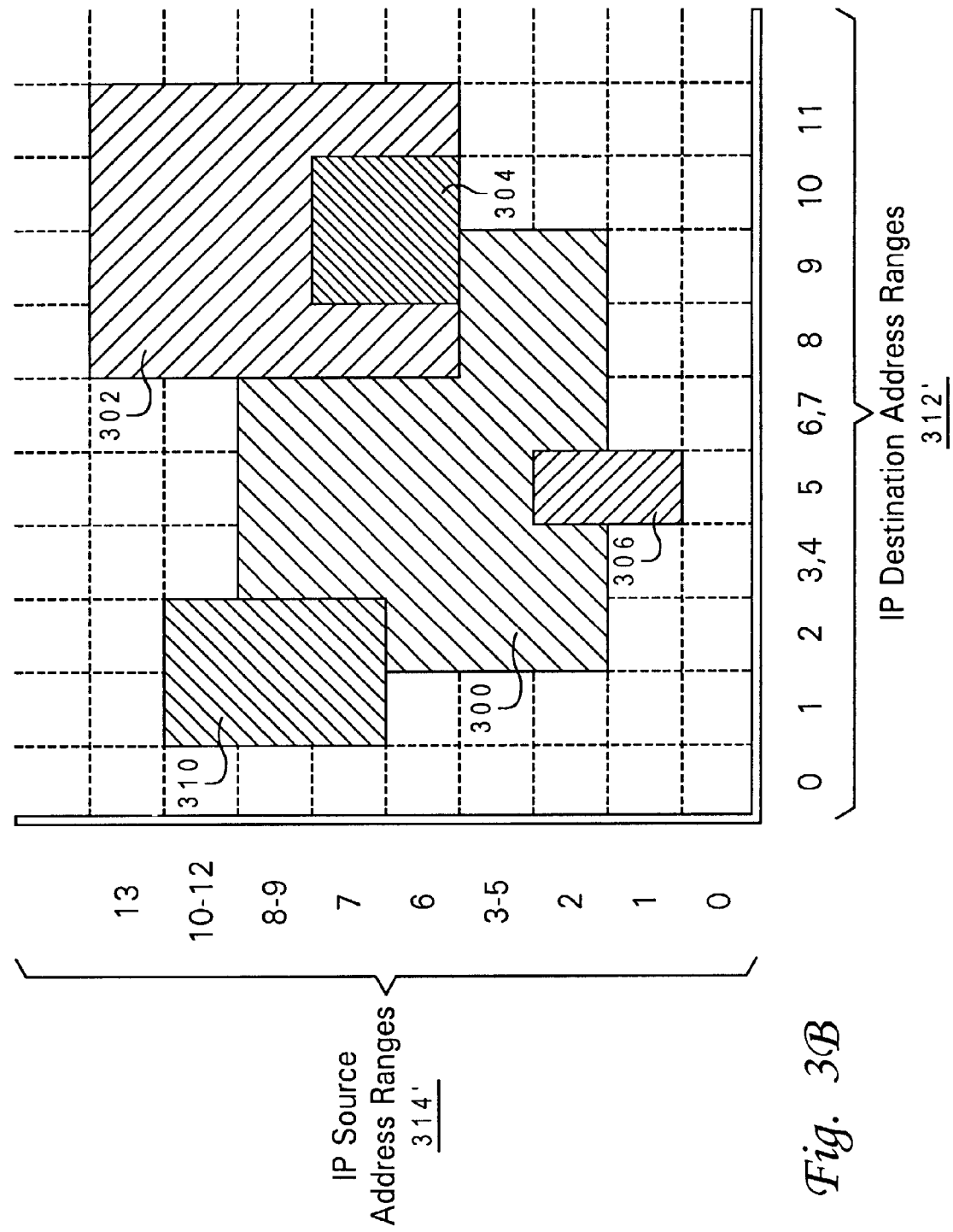

With reference now to FIG. 3b, the address ranges are further expanded by the addition of null entries such that the number of subranges corresponding to each range is exactly a power of two wherever possible. This process starts with the rule within a cluster of overlapping rules having the fewest range segments, and proceeds to process each subsequent rule in the order based on number of range segments, finishing with the rule with the largest number of range segments. In the expansion of overlapping ranges, any subranges added are placed to achieve equal numbers of subranges on each side of range intersection points, preferably powers of two. Thus, IP destination address ranges are redefined and labeled 0 through 11 to account for the addition of two null range segments, instead of 0 through 9 as shown in FIG. 3a. Note that IP destination address range numbers in dimension 312' in FIG. 3b may be different IP destination address range numbers than those shown as IP destination address range numbers in dimension 312 in FIG. 3a. The IP destination address ranges in dimension 312 prime shown in 3-b are designed to represent each rule by a number of individual segments where that number of segments is a power of two, whenever possible, in order to achieve optimum efficiency in an output stage as described below. Specifically, by expanding label ranges to powers of two, mapping segment number entries using a Gray code sequence will achieve optimal encoding efficiency by taking advantage of folding points (symmetry) which conveniently occur in a Gray code sequence. FIG. 4 described below illustrates options for optimum alignment of rule ranges to take advantage of these folding points.

Figure 3C:
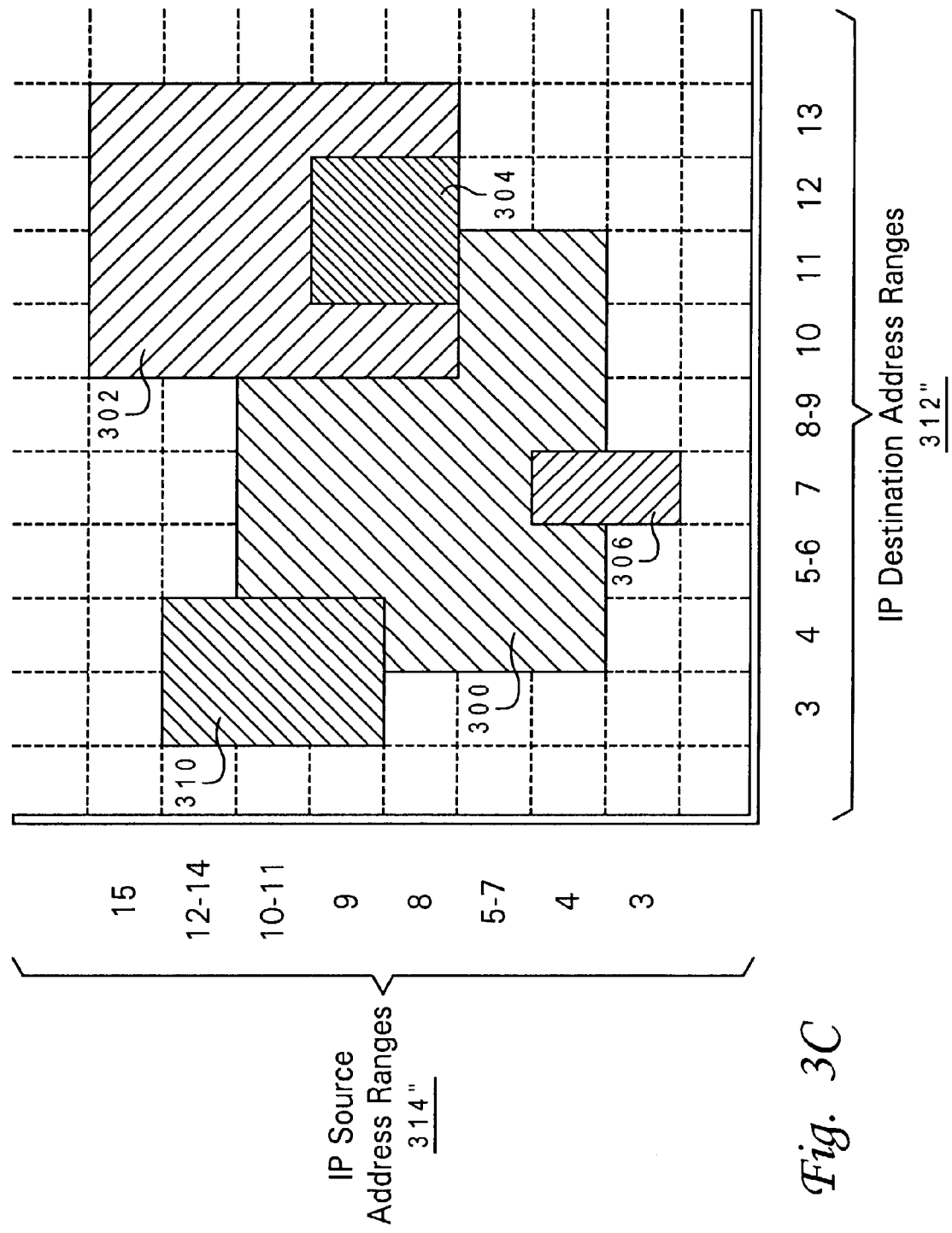
FIG. 3c illustrates offsetting ranges to optimum alignment positions having similar bits in a range number.

Referring now to FIG. 3c, rule 300, being the rule encompassing more ranges than other rules, is shifted in the sequence of range numbers to a convenient alignment point based on the number of unique range numbers representing the rule, such as those described below in FIG. 4, thus enabling the desired coding of those ranges with a single CAM entry in an output stage. Any overlapping rules in the same cluster of rules are shifted by equal numbers of segments to maintain the previously established relationship among overlapping rules. In the case of rule 300, 8 unique ranges are required in both dimensions (range numbers 4-11 in dimension 312" and range numbers 4-11 in dimension 314"), requiring that one of the alignment options illustrated in FIG. 4b should be selected for each dimension. Note that each range centered on an intersection with another range of equal or larger size is preferably optimally aligned if the larger range is offset to an optimum alignment. This suggests a hierarchical processing methodology for expanding rules within each cluster of overlapping rules, starting with small rule ranges and working up to the largest ranges within the cluster. This process may create unused regions of the sequence of preprocessing entries. Those regions may be filled with other non-overlapping rule values or ranges to avoid wasting valuable CAM capacity.

Figure 3D:
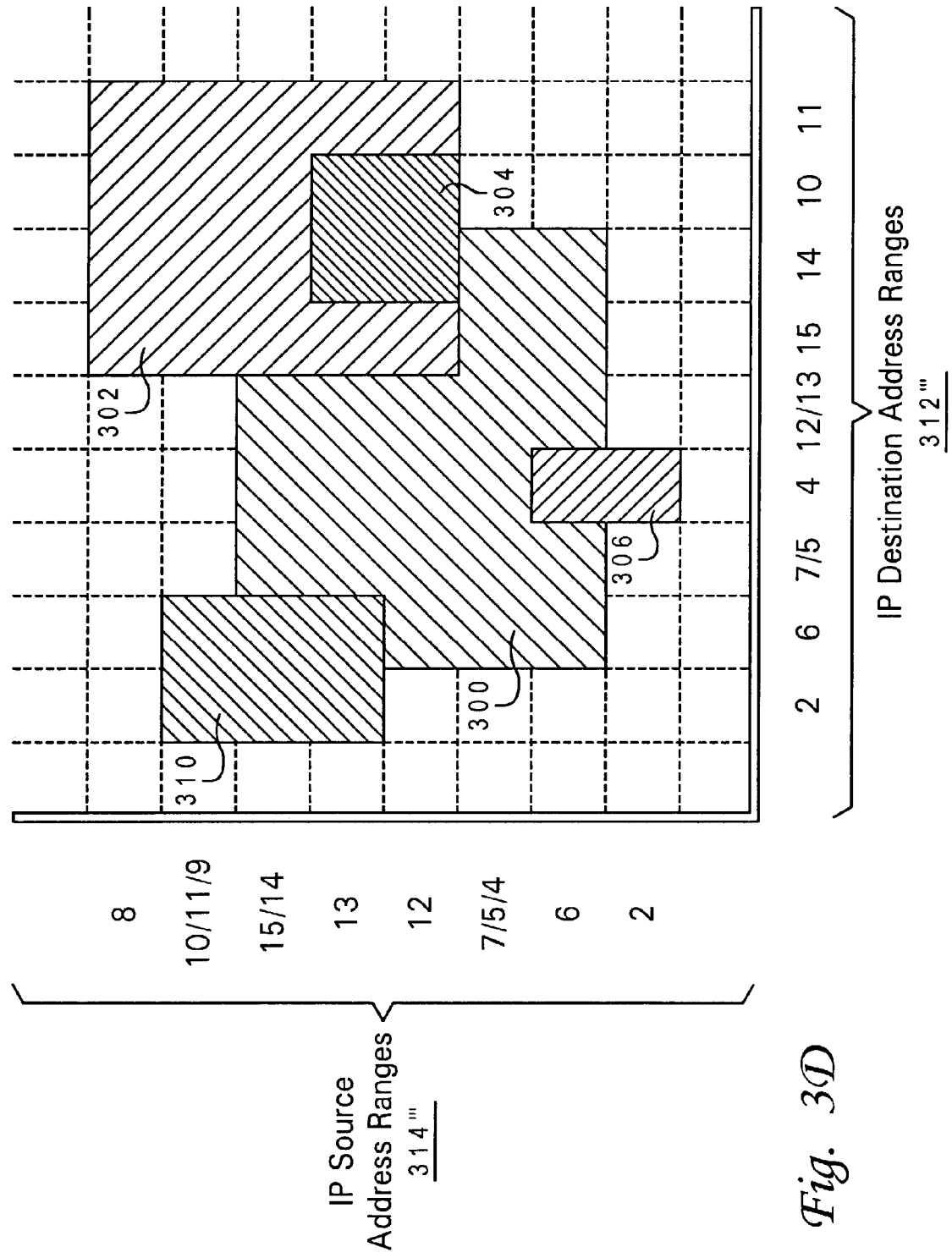
FIG. 3d describes graphically a mapping of ranges in Gray code sequences.

Finally, as depicted in FIG. 3d, range values in dimensions 312''' and 314''' are mapped into a Gray code sequence that aligns each rule on optimal alignment positions such as those shown in FIG. 4. The arranged labels indicated in FIG. 3-d correspond to actual entries in CAM's used in FIG. 5, in the preprocessing CAM's. Note however that for ranges that have been expanded to use multiple range numbers, only one of those numbers is required to be in the preprocessing CAM. The choice of which one (or ones) of those numbers to use to represent a specific range may be made to minimize the number of entries required in the final stage CAM for those ranges that could not be transformed into a power of two number of segments. In an alternative embodiment, CAM entries relate to those binary values depicted in FIG. 3-c, and rely on a binary-to Gray code conversion as part of a search key assembly step between the preprocessing stage CAM's and the final classification lookup CAM.

Referring now to FIGS. 4a-c, there are associated optimum range alignment options using Gray code sequence, where an optimum range alignment is defined as a positioning of a group of consecutive segment numbers such that the entire group can be represented by a single ternary term (e.g. 0, 1, or X for each bit position). For example, consider a range for a dimension that has 16 entries shown in FIG. 4a. That is, consider a range of IP destination addresses consisting of 16 consecutive sub-ranges. When the 16 range numbers are mapped to Gray code, there are three possible positions within the first 32 range numbers that may be used for this range that allow representation as a single ternary term. These range numbers are from 0-15, 8-23, and 16-31. Range numbers from 0-15 may be represented by a ternary entry in the form of "0XXXX". For the 8-23 range, the corresponding ternary entry is in the form of "X1XXX", and for the 16-31 range, the entry is in the form of "1XXXX". Similar optimal alignments for ranges of 8 and 4 entries are also shown in FIGS. 4b and 4c. It is further observed that the alignments depicted by the lower heavy bars under each description of 16, 8, or 4 entries correspond to optimum alignments for binary numbers, while the upper bars correspond to those additional optimum alignments afforded by the use of a Gray code sequence. That is, for optimal alignments of 16 range segment entries, ranges 0-15 and 16-31 provide valid alignment choices under either binary or Gray code sequences, while the alignment shown for segments 8-23 is only available in a Gray code sequence. It should also be noted that each of these ranges of sequence numbers may be characterized by an axis of symmetry or a folding point that divides the first half of the ranges from the second half. Because optimum alignment choices are staggered, the boundary of one group of range numbers always falls on a folding point for another alignment choice for any group with equal or fewer ranges. If smaller ranges have previously been balanced relative to intersection with larger rules, this characteristic results in optimum alignment of all overlapping rule ranges in a cluster by aligning only the largest range.

Figure 5:
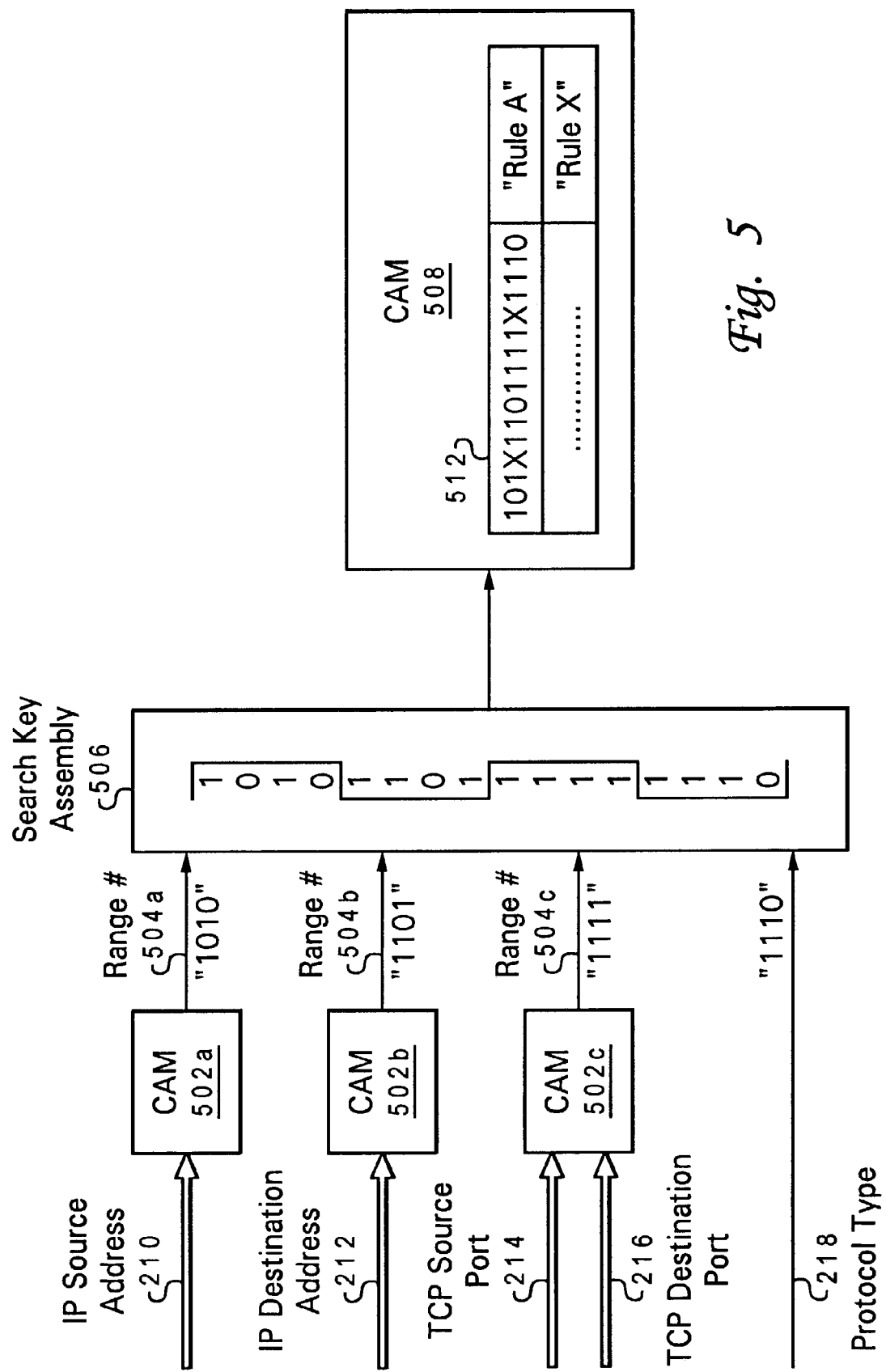
FIG. 5 depicts a block diagram of a five way parallel packet classification system associated with a router.

Referring now to FIG. 5, there is depicted a system for determining a rule for a specific set of range values. IP source address 210 is presented to CAM 502a, IP destination address 212 is presented to CAM 502b, TCP source port 214 and TCP destination port 216 are presented to CAM 502c, and protocol type 218 provides its own unique value. CAM's 502 are preferably content addressable memories, although any table and cross-reference system memory may be used in an alternative embodiment. Each CAM presents a range number corresponding to its input. That is, CAM 502a presents a range number 504a, which corresponds to IP source address 210, and so on. For purposes of illustration, assume that the range number 504a is 1010. Likewise, assume that the range number 504b is 1101, range number 504c is 1111, and the protocol type number is 1110. These four values are concatenated in search key assembly 506, to generate the value 1010, 1101, 1111, 1110. Each range number 504 represents a selected sequence number from the Gray code sequence, that sequence number corresponding to the range of parameter values encompassing the parameter value 210, 212, 214/216, or 218, extracted from the packet for each dimension. In an alternative embodiment, the range numbers 504 may be selected from a binary sequence of range numbers. The concatenated search key 512 is presented to CAM 508, which identifies either a rule or a pointer to locate a rule, which defines and instructs how the particular packet should be handled. Note that the output of each pre-processing CAM 502 corresponds to a specific range segment while each entry in the final stage CAM 508 represents a group of range segments which according to the methods described herein can be represented using a ternary CAM entry with some bits marked as "X" ("don't care"). Thus the matching entry in CAM 508 must only match the assembled search key 512 in those bit positions where the CAM entry contains a "1" or "0", while bit positions containing "X" are ignored in the comparison.

While the four CAM's shown in FIG. 5 may be separate hardware CAM's connected as shown, CAM's 502a-c and 508 may be part of a larger CAM with control logic to sequence through each field accumulating a range number for each step. Either way, the range number from processing each field is concatenated by the search key assembly unit 506 to obtain a final search key input to the rule search phase. By having the range labels of the first stage encoded as described above, the output CAM 508 can efficiently represent each actual rule by single entry, thus reducing the total number of CAM entries required to represent a given set of rules. Encoding of each range CAM 502 requires a single entry per range for ranges defined by prefixes, but potentially requires multiple entries for arbitrary ranges. Priority of CAM entries, illustrated graphically in FIGS. 3a-d via overlapping rectangles, may be used to reduce the number of entries required to represent some ranges if segments of those ranges can be covered by other higher priority CAM entries.

Figure 6:
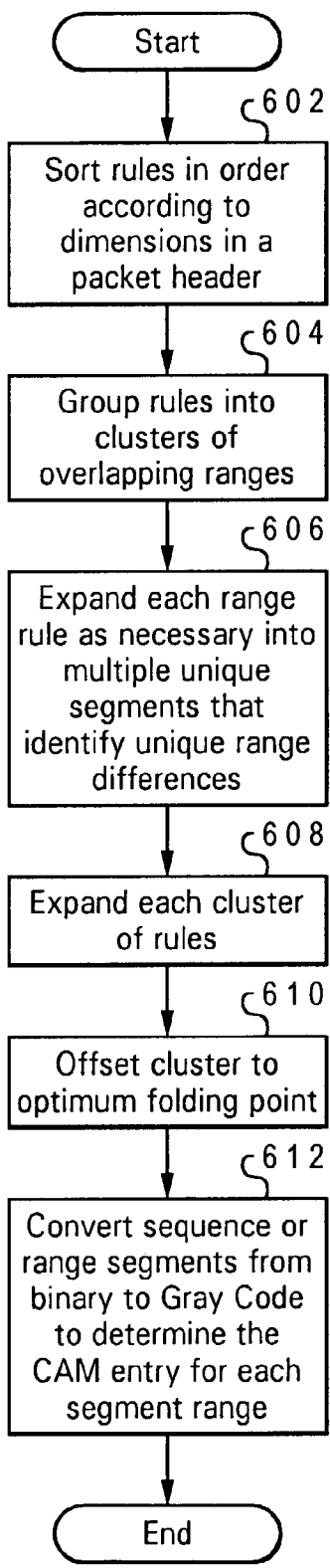
FIG. 6 is a flow chart of a preferred embodiment of steps taken in the present invention for constructing a search structure to be used for classifying data packets.

With reference now to FIG. 6, there is depicted a flow chart of a preferred embodiment of the present invention to separately process complex range rules for each dimension as described below. Accordingly, the steps described below are repeated independently for each dimension defined by the rule set. As shown in step 602, predefined rules are sorted in a preferably sequential order according to applicable ranges for parameter values. That is, if a dimension in a new rule specifies a particular parameter value or range of values, the rule associated with that value is prioritized and/or ordered according to the magnitude of the parameter value (or the low end of a range of values). Proceeding to step 604, the rules are grouped into clusters of overlapping or intersecting ranges, as depicted in FIGS. 3a-d. Note that two ranges are considered to intersect in a dimension if their ranges overlap in that dimension, even if in multi-dimensional space the rules do not overlap. Proceeding to step 606, each range rule is expanded as necessary into multiple range segments, such as described above in FIG. 3-a. Thus, each range rule is expanded as necessary into multiple unique segments that identify a unique range intersection. Proceeding to step 608, each cluster of rules is expanded as described in FIG. 3b. That is, additional segments are added to some overlapping ranges such that each group of range segments contains a number of individual segments that is a power of two, as shown in FIG. 3-b. The added segments represent ranges of values with zero width, keeping original range segments at previously defined ranges of parameter values. As illustrated in FIG. 3-b, ranges are processed in order of number of range segments, starting with the smallest. The range of a smaller rule is divided by a range intersection with another range in the same cluster of equal or larger size that hasn't been processed. The number of range segments is set to be a power of two, with dummy range segments added if necessary. The dummy range segments are distributed on the short side of the range segments so that there is symmetry on the folding point of the range. If the resulting range doesn't have an equal number of segments on either side of the range intersection, the number of segments is incremented and they become a new power of two. If any previously processed range becomes unbalanced due to current addition of dummy ranges, the previous range is rebalanced by adding additional dummy segments that are exclusive to that range. If it is not possible to assign exclusive dummy segments, then the previously processed range is rebalanced by moving dummy segments from one side of its range intersection to the other. If it is still not possible to rebalance the range, then dummy segments are manipulated such that there is at least symmetry on either side of the center of the range level. As described in FIG. 3-c, the rules are then offset such that optimal alignment of the largest (in terms of number of range segments) range in the cluster is achieved, as described in block 610. If additional offset is necessary to avoid overlap with a previously processed cluster, then the additional offset is added. Note that the additional offset must be to another optimal alignment position matching the number of range segments in the largest range.

Proceeding then to block 612, the sequence of range segments is converted from binary to Gray code and each group of range segments corresponding to a parameter range for an individual rule is combined into a single ternary value to determine the CAM entry for use with each segment.

Figure 7:
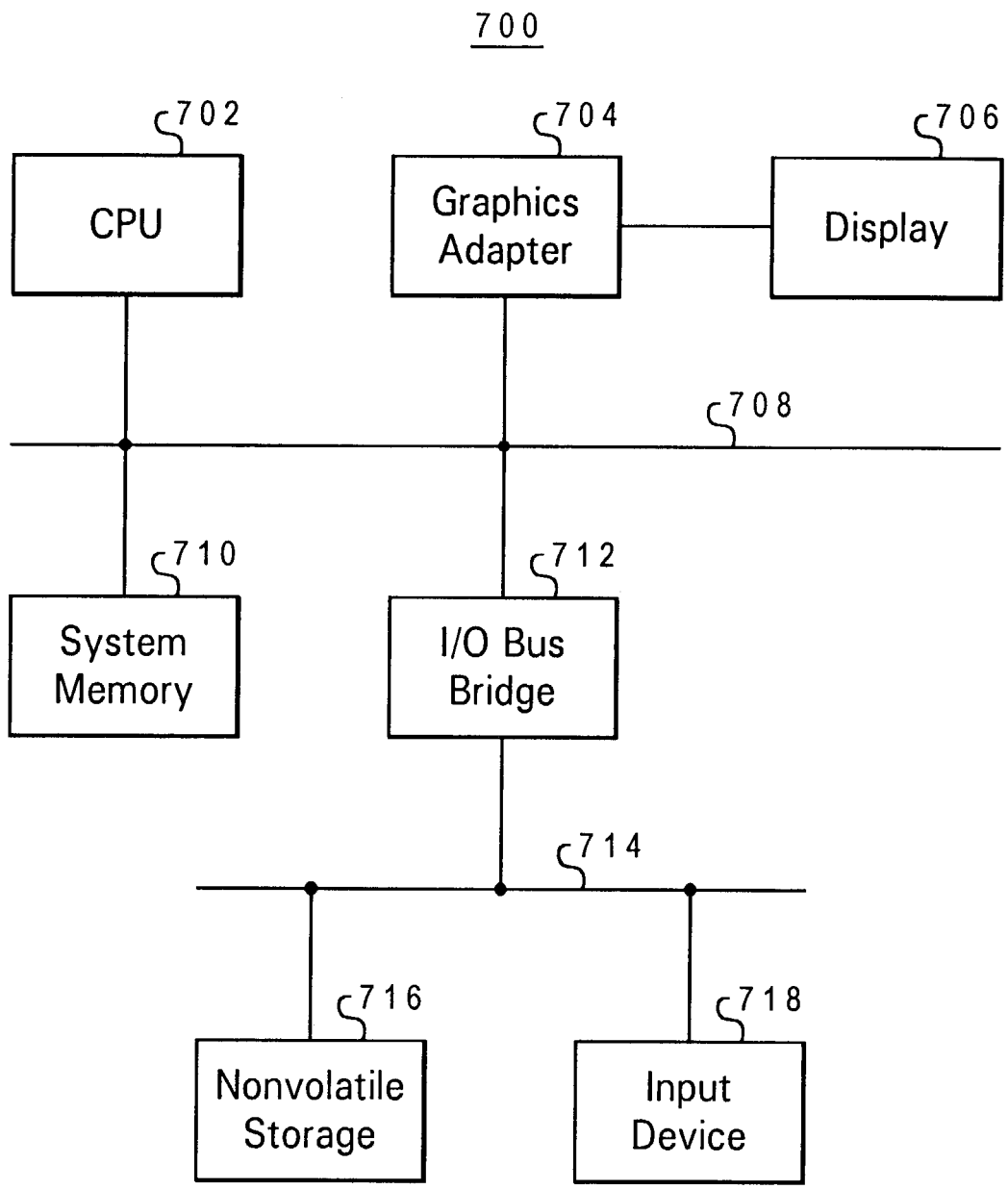
FIG. 7 is a block diagram of a preferred embodiment of a computer processing system used by the present invention.

With reference now to FIG. 7, there is depicted a block diagram of a data processing system in which a preferred embodiment of the present invention may be implemented, including that process described in FIG. 6. Data processing system 700 may be, for example, one of the models of personal computers available from International Business Machines Corporation of Armonk, N.Y. Data processing system 700 includes a central processing unit (CPU) 702, which is connected to a system bus 708. In the exemplary embodiment, data processing system 700 includes a graphics adapter 704 also connected to system bus 708, for providing user interface information to a display 706.

Also connected to system bus 708 are a system memory 710 and an input/output (I/O) bus bridge 712. I/O bus bridge 712 couples an I/O bus 714 to system bus 708, relaying and/or transforming data transactions from one bus to the other. Peripheral devices such as nonvolatile storage 716, which may be a hard disk drive, and input device 718, which may include a conventional mouse, a trackball, or the like, is connected to I/O bus 714.

The exemplary embodiment shown in FIG. 7 is provided solely for the purposes of explaining the invention and those skilled in the art will recognize that numerous variations are possible, both in form and function. For instance, data processing system 700 might also include a compact disk read-only memory (CD-ROM) or digital video disk (DVD) drive, a sound card and audio speakers, and numerous other optional components. All such variations are believed to be within the spirit and scope of the present invention.

Although aspects of the present invention have been described with respect to a router and network, it should be understood that at least some aspects of the present invention may alternatively be implemented in a program product for use with a data storage system or computer system functioning as a router. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such single-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method of processing parameter ranges for each parameter field in a packet classification rule, said method comprising:
    (a) associating at least one rule with at least one dimension, said dimension being a parameter in a network packet, said at least one rule being an instruction to a router for processing said network packet;
    (b) sorting said at least one rule according to a dimension associated with each set at least one rule;
    (c) grouping said at least one rule with a second at least one rule into a cluster of rules with overlapping ranges, overlap of said ranges being determined by said at least one dimension;
    (d) upon determining that said at least one rule overlaps said second at least one rule, expanding said cluster of overlapping rules into multiple unique segments that identify unique range intersections;
    (e) expanding the number of said multiple unique segments such that each rule has a number of segments that is a power of two;
    (f) offsetting each said cluster to an optimum alignment position;
    (g) converting the numbering of said range segments from binary to Gray code to create Gray coded range segments;
    (i) identifying a unique rule corresponding to a group of said Gray coded range segments; and
    (j) utilizing the unique rule to define and instruct how a particular packet is to be routed.

2. The method of claim 1, wherein the unique rule is identified by a Content-Addressable Memory (CAM).

3. The method of claim 2, wherein the CAM instructs how the particular packet is to be routed.

4. The method of claim 1, wherein said optimum alignment position is a range wherein all numbers making up a collection of range numbers defining said range may be combined into a single number wherein all bit positions of the combined number are either fixed or "don't care".

5. The method of claim 1, wherein said expanding the number of said multiple unique segments is accomplished by adding at least one dummy range segment, wherein said at least one dummy range segment encompasses no parameter values.

6. The method of claim 5, wherein said expanding the number of said multiple unique segments balances a number of segments on each side of an intersection with another rule.

7. The method of claim 6, wherein said expanding the number of said multiple unique segments balances a number of segments further comprises examining a previously expanded rule to determine if processing of a current rule has created an imbalance in a previously balanced rule, and rebalancing said previously balanced rule if said previously balanced rule has become imbalanced due to said expanding of said current rule.

* * * * *